Sept. 2, 1969  HO CHOW  3,464,628
SELECTIVE PATTERN LAWN SPRINKLER

Filed Sept. 8, 1967  6 Sheets-Sheet 1

INVENTOR
HO CHOW
BY James K. Franklin
ATTORNEYS

Sept. 2, 1969            HO CHOW            3,464,628

SELECTIVE PATTERN LAWN SPRINKLER

Filed Sept. 8, 1967            6 Sheets-Sheet 3

INVENTOR
HO CHOW
BY
ATTORNEYS

Sept. 2, 1969    HO CHOW    3,464,628
SELECTIVE PATTERN LAWN SPRINKLER
Filed Sept. 8, 1967    6 Sheets-Sheet 4

INVENTOR
HO CHOW
BY
James & Franklin
ATTORNEYS

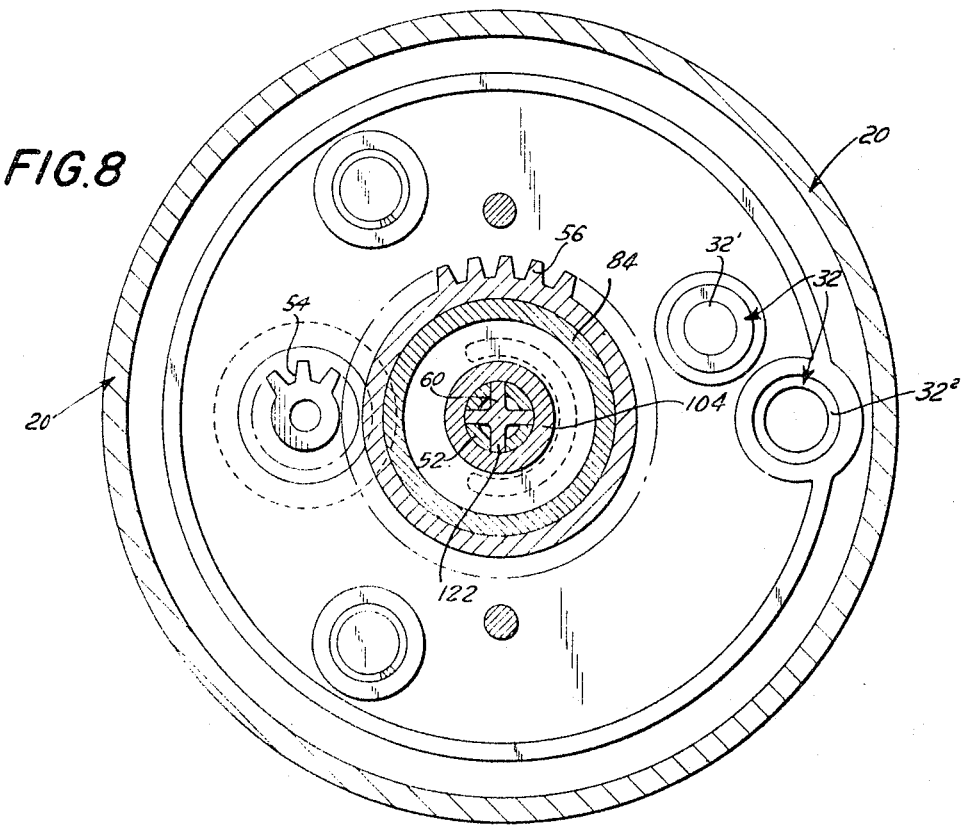
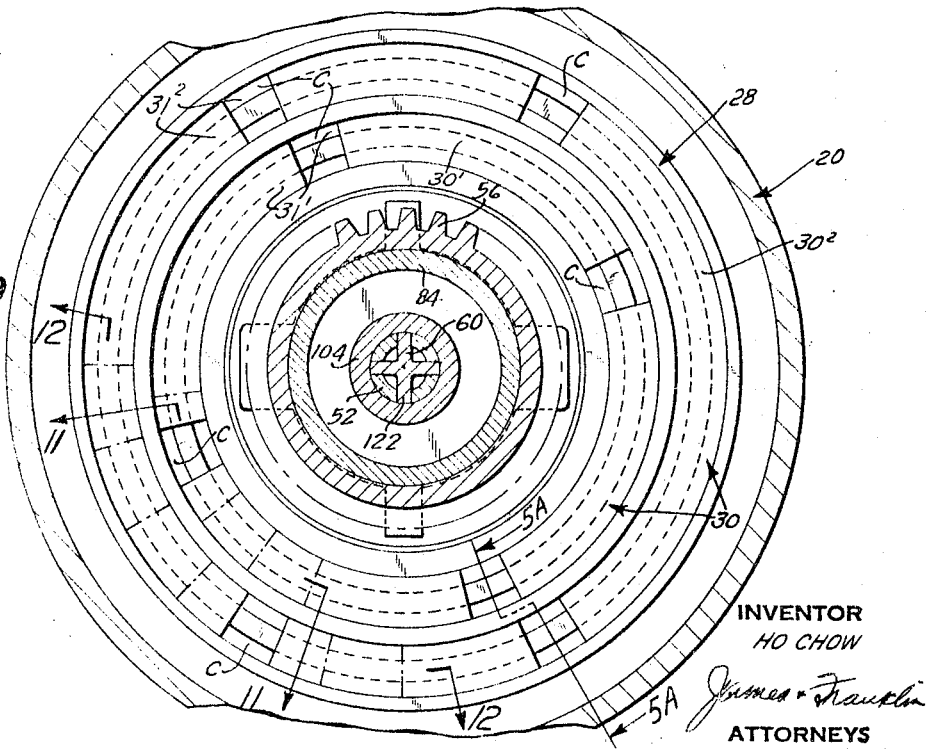

Sept. 2, 1969  HO CHOW  3,464,628
SELECTIVE PATTERN LAWN SPRINKLER
Filed Sept. 8, 1967  6 Sheets-Sheet 6

INVENTOR
HO CHOW
BY
James & Franklin
ATTORNEYS

United States Patent Office 3,464,628
Patented Sept. 2, 1969

---

3,464,628
SELECTIVE PATTERN LAWN SPRINKLER
Ho Chow, River Edge, N.J., assignor to International Patent Research Corporation, Moonachie, N.J., a corporation of New York
Filed Sept. 8, 1967, Ser. No. 666,257
Int. Cl. B05b *3/02, 3/08*
U.S. Cl. 239—97      20 Claims

ABSTRACT OF THE DISCLOSURE

A selective pattern lawn sprinkler designed to selectively spray different lawn area patterns, and for each selected pattern to effect the uniform spraying of the water over the area. The construction is characterized by the provision of a water distribution head, a pattern selector cam and a deflector, each rotatable by the water motor or impeller of the sprinkler, and so interrelated as to enable any one of a plurality of different area patterns to be selectively sprayed, with uniform distribution of the water over the sprayed areas.

---

This invention relates to a multiple-pattern lawn sprinkler and more particularly to a lawn sprinkler embodying selective means for varying the area spray pattern of the sprinkler.

The prime object of the present invention is the provision of a multiple-pattern lawn sprinkler constructed and designed to selectively spray different lawn area patterns such as "round," "square," "rectangle," etc., and to distribute the water sprayed uniformly circumferentially and radially over the selected spray area.

In carrying out this prime object of the invention, more specific objects are the provision of:

(1) a multiple-pattern sprinkler in which a rotatable nozzle carrying distribution head rotatively driven by the water motor or impeller of the sprinkler is combined with a rotatable pattern selector cam also rotatively driven by the impeller, the cam being provided with fluid flow-varying passages, the impeller and the cam being interrelated so that the consequent relative fluid flow to the impeller and through the cam passages determines the rotative movement of the distribution head and the consequent pattern of the area being sprayed;

(2) such multiple-pattern sprinkler in which the cam is provided with a plurality of sets of flow-varying passages, each selected set of passages determining a different spray area pattern for the sprinkler; and (3) a multiple-pattern sprinkler in which a rotatable nozzle carrying distribution head rotatively driven by the impeller is combined with a rotatable deflector also rotatively driven by the impeller in such a way that for any selected pattern area, the water will be sprayed uniformly, circumferentially and radially, over the selected spray area.

To the accomplishment of the foregoing objects and such other objects as may hereinafter appear, the invention relates especially to the selective pattern lawn sprinkler defined in the appended claims taken together with the following specification and the accompanying drawings, in which:

FIG. 8 is a view thereof taken in cross-section in the plane of the line 8—8 of FIG. 3;

FIG. 9 is a view thereof taken in the plane of the line 9—9 of FIG. 3;

Figure 2:
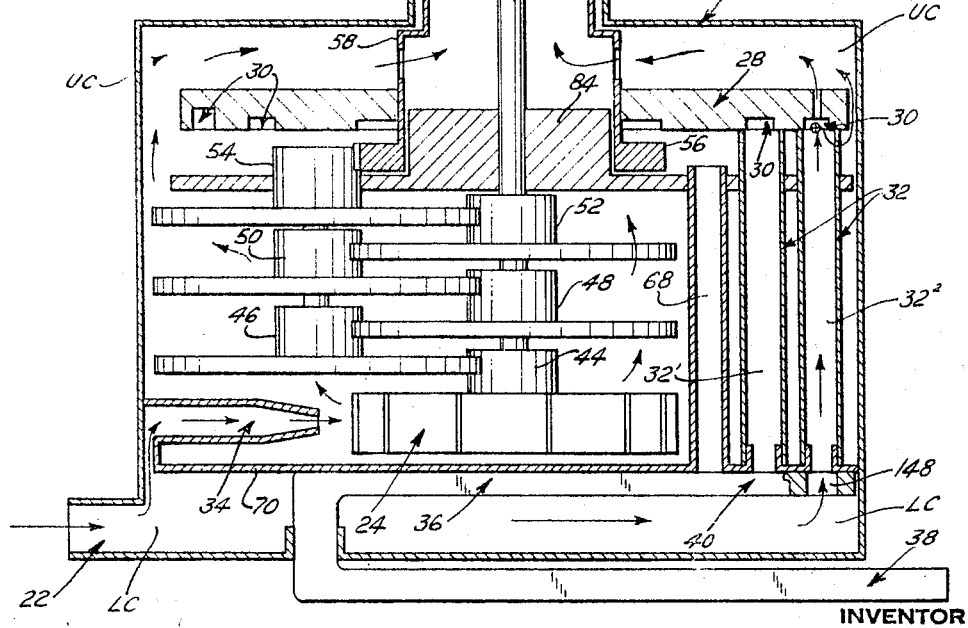
FIG. 2 is a diagrammatic view shown mainly in vertical cross-section explanatory of the basic mechanism and the fluid flow passages which characterize the lawn sprinkler of the invention.

Referring now more in detail to the drawings and having reference first to FIG. 2 of the drawings which is diagrammatic in nature but which is explanatory of the basic mechanism and the flow paths of the sprinkler, the structure comprises essentially a housing generally designated as 20, provided with a fluid inlet 22, an impeller generally designated as 24 rotatably mounted in said housing 20 in open communication with the housing interior, a rotary nozzle carrying fluid distribution head generally designated as 26 connectedly driven by said impeller 24 and rotatably mounted in said housing 20 in open fluid communication with the housing interior.

The structure further includes a pattern selector cam generally designated as 28 also rotatably mounted in said housing 20 connectedly driven by said impeller 24, said cam being provided with fluid varying passages generally designated as 30 having exit ends in open communication with the housing interior, the said cam being associated with cam directed conduits generally designated as 32 mounted in said housing 20 in fluid communication with the fluid inlet 22 at the entrant ends of said conduits, this communication being separate from a fluid communication between the said inlet 22 and an impeller directed conduit generally designated as 34. Associated with the cam 28 and the plurality of cam directed conduits 32 is a selector switch generally designated as 36, movably mounted in said housing provided with an externally arranged manually manipulatable indicator 38, the selector switch being provided with means generally designated as 40 for selectively opening one at a time the entrant ends of the cam directed conduits 32, the operation being such that the said means opens the entrant end of one of said conduits and closes the entrant end or ends to the others of said conduits.

The structure of the invention further includes a rotary deflector generally designated as 42, surmounting the fluid distribution head 26 rotatably mounted in said housing 20 and drivenly connected to the impeller 24. The deflector is so constructed and is rotated as will presently appear at a speed different than the rotation of the distributor head 26 so that the fluid jets emanating from the nozzles carried by the distributor head are varyingly interrupted as well as deflected so as to produce a uniform distribution of the water over a selected sprayed area.

The driving connections between the distributor head 26, the cam 28, the deflector 42 on the one hand and the impeller 24 on the other includes a gear train comprising the following intermeshing elements, namely a pinion 44 integral with the impeller 24, a first gear-pinion set 46, a second gear-pinion set 48, a third gear-pinion set 50, a fourth gear-pinion set 52 and a fifth gear-pinion set 54, the pinion of which meshes with a gear 56 integral with a bearing 58 forming part of the distributor head 26. The deflector 42 is connected by its central shaft 60 to the pinion of the gear-pinion set 52. The cam 28 is preferably fixed to the bearing 58 by being splined thereto (permitting, however, axial floating movement of the cam). As a result of this preferred construction the distributor head and cam are rotated together by the impeller at one reduced speed and the deflector 42 is rotated by the impeller at another and a different reduced speed and preferably (though not necessarily) at a less reduced speed, i.e. at a rotational speed greater than the rotational speed of the combined distributor head and cam.

Figure 1:
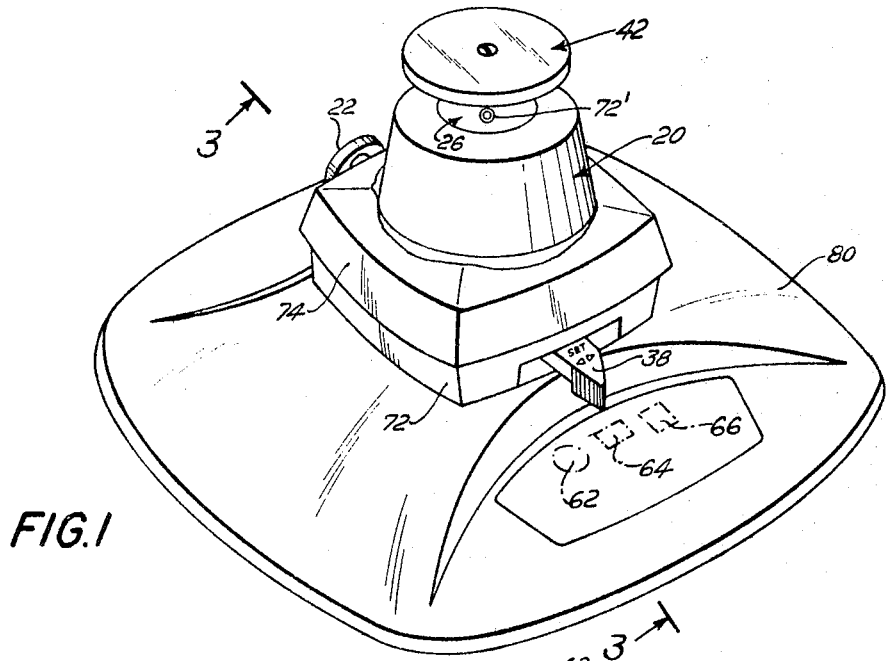
FIG. 1 is a perspective view of the exterior design of the lawn sprinkler of the present invention.

The sprinkler structure which is exemplified by FIGS. 1 and 2 of the drawings is designed to produce three different area patterns geometrically designated in FIG. 1 by the "round" pattern 62, the "rectangle" pattern 64 and the "square" pattern 66 selected by the manual manipulation of the selector switch indicator 38 as is clearly depicted in FIG. 1 of the drawings, the "square" and "rectangle" patterns being determined by the selective opening of the cam directed conduits 32 and the "round" pattern being determined by the selective opening of a third conduit 68, the exit end of which is open to the interior of the housing 20.

The fluid flow characteristics produced by the described structure are indicated by the flow arrows (the arrows undesignated by reference characters) in FIG. 2 of the drawings. The housing 20 is subdivided into a lower chamber LC and an upper chamber UC by means of a partition 70; and as will be evident, the upper chamber UC has mounted therein the rotary impeller 24, the rotary nozzle carrying fluid distribution head 26, the rotary cam 28 and the impeller directed conduit 34, the said conduit being in fluid communication with the lower chamber LC. The cam directed conduits 32 as well as the third conduit 68, each constituting a by-pass conduit, are also mounted in the upper chamber UC and are in fluid communication at their entrant ends with the lower chamber LC. As a result of this construction the water entering the fluid inlet 22 is divided between that part entering into and emitted from the impeller conduit 34 and that part which is permitted to enter into the entrant end of one of the conduits 32, 68 selected by the operation of the deflector switch 36, 38. The arrows indicate the combined fluid flow that takes place in the upper chamber leading to the fluid outlets defined by the nozzles 72' and 74' carried by the distributor head. The cam passages 30 determine the amount of the by-pass fluid flow and therefore determine the amount of the fluid impinging upon the impeller 24 which in turn determines the speed of rotation of the impeller 24.

The opening of a by-pass conduit 32 selected by the selector switch 36, 38 and the pattern of a set of passages 30 of the cam 28, regulates the flow rate of water passing by way of the cam, thereby modifying and determining the water ejected onto and consequently the speed of rotation of the impeller 24; and the combined water from the impeller passage and the by-pass passages ejects from the nozzles 72', 74'. The distance of water projectile depends on the flow rate. Therefore, the pattern of watering is controlled by the opening size of the by-pass passages as determined in the design of the cam. The deflector 42 in turn, as will be made clearer hereinafter, varyingly interferes with and selectively deflects the water ejected from the nozzles in such a way as to effect a uniform radial distribution of the water in the selected pattern.

In FIGS. 3 to 14 of the drawings which show the actual structure of the sprinkler, the parts corresponding to the parts shown in the diagrammatic representation of FIG. 2 are given the same reference characters as those applied to FIG. 2 of the drawings.

Figure 3:
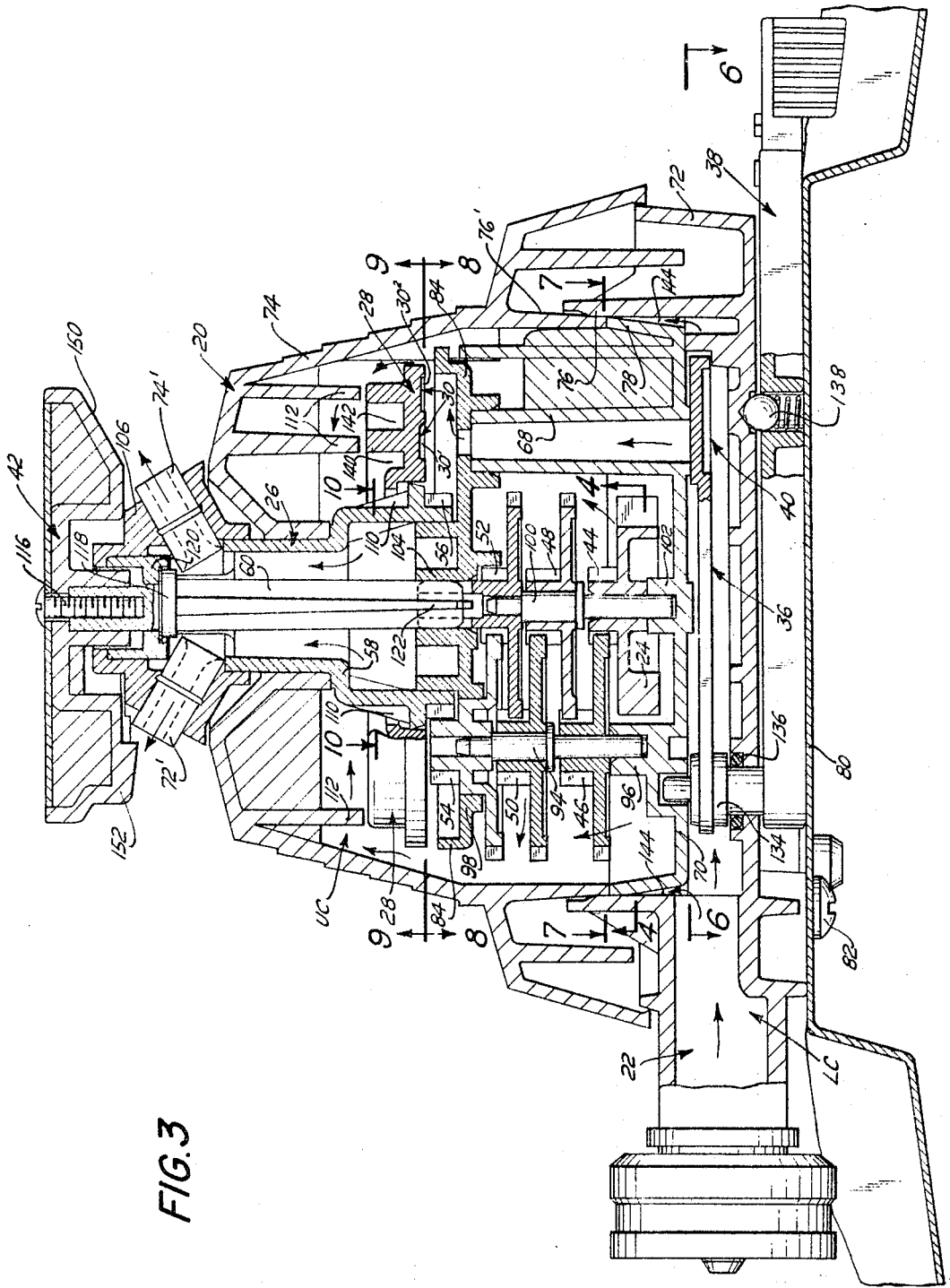
FIG. 3 is an elevational view of the actual structure of the lawn sprinkler taken mainly in cross-section in the planes of the broken line 3—3 of FIG. 1, also 3—3 of FIG. 7.

The housing 20 comprises more specifically a lower section 72 and a cover section 74, these sections being statically sealed togther (without a gasket material) at 76, a circular shaped lip 76' being provided in the cover section 74 at the sealing area. This ring lip is contracted to provide the seal by pressing into the lower section 72, with a flange 78 of the partition 70 sandwiched between them as clearly shown in FIG. 3. The housing sections are mounted on a base 80, a number of screws, one or which (82) is shown in FIG. 3, is provided to hold the base and the cover section 74 to the lower section 72 of the lower section 72 of the housing.

Figure 4:
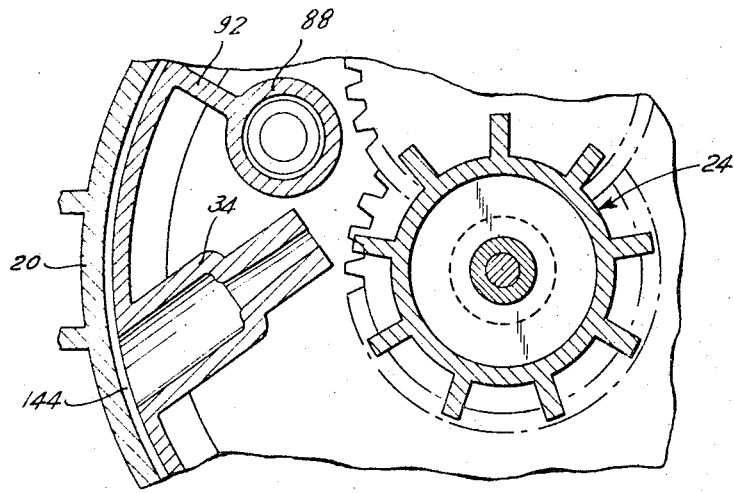
FIG. 4 is a fragmentary view thereof featuring the operation of the impeller and taken in cross-section in the plane of the line 4—4 of FIG. 3.
Figure 7:
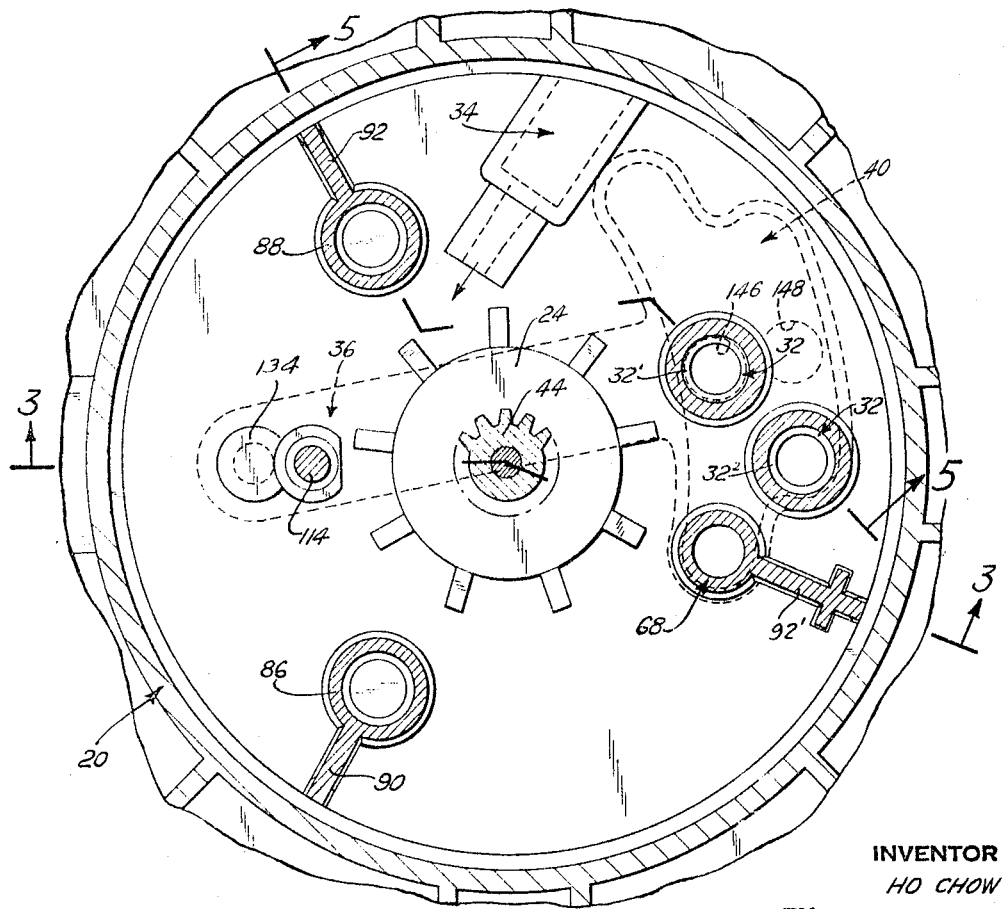
FIG. 7 is a view thereof taken in cross-section in the plane of the line 7—7 of FIG. 3.
Figure 10:
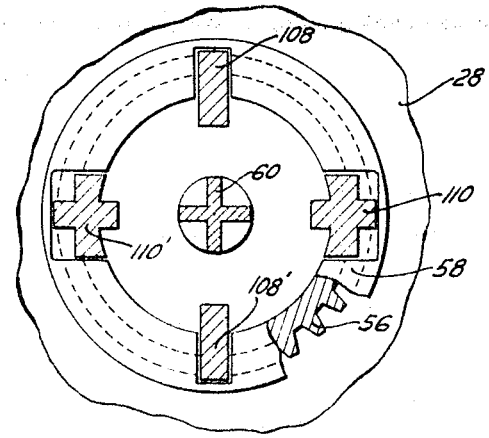
FIG. 10 is a view thereof taken in cross-section in the plane of the line 10—10 of FIG. 3.
Figure 11:
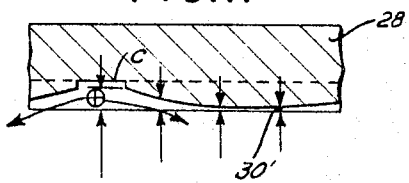
FIG. 11 is a fragmentary view featuring the cam and passages thereof, this view being taken in section along the arcuate path designated by the line 11—11 of FIG. 9.
Figure 12:
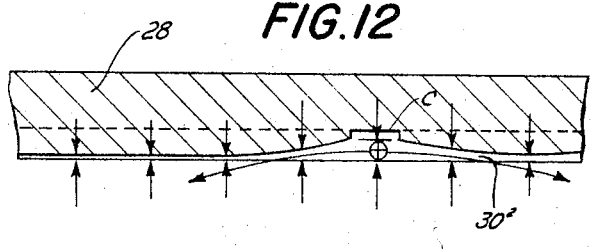
FIG. 12 is a similar view taken in section along the arcuate path designated by the line 12—12 of FIG. 9.

The working parts of the sprinkler are mounted in and by the housing 20 as follows:

A spacer 84 is supported midway of the housing by the conduit 68 on one side of the structure and by the two posts 86 and 88 on the other side of the structure, the said posts being secured to the flange 78 of the partition 70 by ribs 90, 92 as best shown in FIGS. 7 and 4 of the drawings. The conduit 68 is secured to the partition 70 by rib 92'.

The gear sets 46, 50 and 54 rotatively mounted on a spindle 94 are supported by the partition 70 and the spacer 84 by said spindle being received at its lower end in a bearing 96 forming part of the spacer 70, the gear set 54 being seated in a bearing 98 forming part of the spacer 84. The impeller and gear 24, 44 and the gear sets 48 and 52, rotatively mounted on a spindle 100 are supported by the partition 70 and the spacer 84 by said spindle being received at its lower end by a bearing 102 forming part of the partition 70, the gear set 52 being seated in a bearing 104 forming part of the spacer 84.

The nozzles 72' and 74' are fixed to a nozzle carrier 106 which is frictionally attached to the bearing 58 to form the distributor head (26). This distributor head is directly coupled to the cam 28 by means of the splines 108, 108' and 110, 110', these latter being shaped differently for orientation purposes, the construction being such that the distributor head and the cam will rotate together at the same speed and stay in phase, the cam, however, being capable of floating on the bearing 58 in an axial or vertical direction. The floating movement of the cam is limited in its uppermost position by stops 112, 112 integral with the upper cover section 74.

Figure 5A:
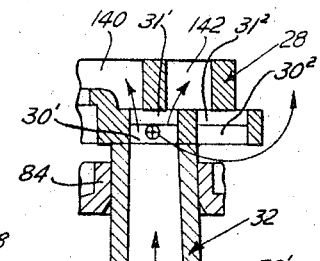
FIG. 5A is a detail view also featuring the relation between the cam and a by-pass conduit therefor, this view being taken in section in the planes of the broken line 5A—5A of FIG. 9.
Figure 5:
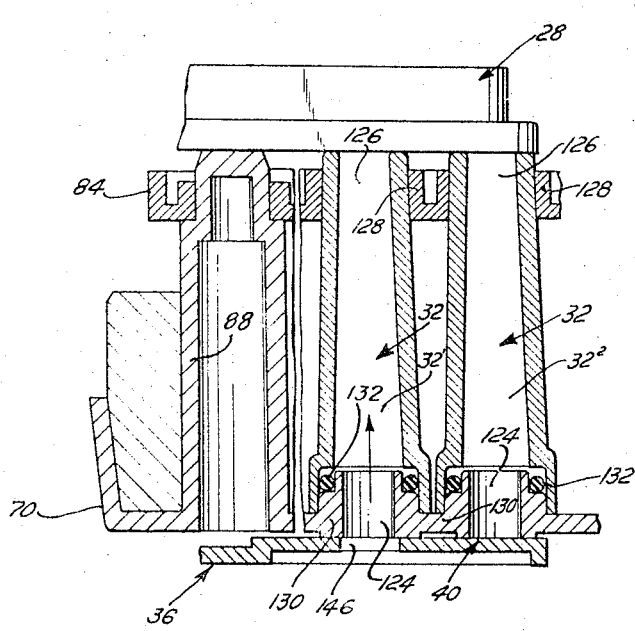
FIG. 5 is a fragmentary view featuring the relation between the cam and the by-pass conduits cooperating therewith, this view being taken in cross-section in the planes of the broken line 5—5 of FIG. 7.

The cam 28 is also supported at its lower face by posts 86 and 88 extending upwardly from and formed integrally with the partition 70 and by the two cam directed conduits 32, the said posts and the conduits being also anchored in and supported by the spacer 84 in the manner best shown in FIG. 5 of the drawings, also indicated in FIG. 7 of the drawings.

The deflector 42 is mounted in the nozzle carrier 106 by being screw attached at 116 to the shaft 60, which shaft is rotatively mounted at 118 in a collar 120 fixed to the nozzle carrier 106. The lower end of the shaft 60 is seated in and splined at 122 to the gear set 52.

The cam directed conduits 32 comprise a conduit 32' for determining a "square" spray pattern and a conduit $32^2$ for determining a "rectangle" spray pattern. These conduits have entrant ends at 124 and exit ends at 126 (see particularly FIG. 5). In order to assure the positive contact of the cam 28 over the exit ends of these cam directed or by-pass conduits 32' and $32^2$, the said conduits are also floatingly mounted in the housing; these conduits guided at their upper ends by the spacer 84 at 128 are floatingly mounted in the collars 130 integral with the partition 70 sealed by the O-rings 132 (see FIG. 5 of the drawings). When a cam directed conduit is opened at its entrant end, the interior of the conduit being connected with the lower chamber has a higher pressure than the exterior of the conduit in the upper chamber; as a result the upward force acting on the conduit against the cam maintains the desired positive contact between the conduit and the cam.

The selector switch 36 is mounted in the lower chamber LC rotatively supported at 134 in the lower housing section 72, there sealed by the O-ring 136. The indicator 38 of the switch is located in the space between the base 80 and the housing section 72 extending therefrom to the exterior of the housing for manual manipulation, the said indicator being provided with a spring actuated detent locating means 138.

The specific structure of the operating parts of the sprinkler will now be described.

The two nozzles 72', 74' spaced 180° apart on the nozzle carrier 106 have a fixed elevation, such as 30° as shown. The elevation angle is determined based on desired water projecting distance, height of water profiles, nozzle size, and selected water pressure at the inlet to the sprinkler. Although the structure may embody a single nozzle, two nozzles as shown are preferred to supply two jets of water at opposite directions, thus eliminating any unbalanced force to tilt the sprinkler structure. Two nozzles can be provided only when the patterns of watering for the sprinkler are all diagonally symmetrical, such as round, square, rectangle, hexagon and ellipse. For unsymmetrical patterns, such as triangle, quarter circle and half circle, only one nozzle need be provided.

The cam 28 as previously set forth is provided with a plurality of sets (30) of flow-varying passages, each set determining a different fluid flow pattern. This is best shown in FIG. 9, the said plurality of sets of passages comprising an inner set 30' and an outer set $30^2$, the inner set cooperating with the inner conduit 32' and the outer set cooperating with the outer conduit $32^2$ (for this see FIG. 5). The inner set of passages 30' is contoured as best shown in cross-section in FIG. 11 of the drawings, at regions spaced 90° apart and the outer set of passages 32' is contoured as best shown in cross-section in FIG. 12 of the drawings, at regions spaced 60° and 120° apart, the former spacing being arranged to yield a "square" spray pattern and the latter arrangement being spaced to yield a "rectangle" spray pattern in the operation of the sprinkler. At the crest $c$ of each of these cam contours, through passages 31' and $31^2$ are provided as best shown in FIG. 5A of the drawings, these exit passages communicating with openings 140 and 142 which open into the housing interior. With this construction when the entrant end of a cam directed conduit is opened, as is shown in FIGS. 5 and 5A for the inner conduit 32', water will flow through the conduit and into the cam passages and thence into the housing interior in the manner best shown in FIG. 5A (see also FIGS. 11 and 12) by the arrows which are directed through the cam openings and by the circled cross, which latter designates the fluid flow laterally through the cam passages. It will be evident that when the conduit 32' is in contact cooperation with the cam, the fluid flow will be through the set of cam passage 30' (for producing the "square" pattern), and when the conduit $32^2$ is in contact cooperation with the cam 28, the fluid flow will be through the set of cam passages $30^2$ (for producing the "rectangle" pattern).

It will be apparent that any number of sets of cam passages combined with any number of by-pass conduits may be provided equal to the number of patterns designed for the sprinkler.

In order to prevent possible clogging of the impeller conduit 34, the structure is designed so that the water from the lower chamber LC passes an annular ring of a very narrow gap, smaller than the impeller opening. This gap is clearly shown at 144 in FIGS. 3 and 4 of the drawings.

Figure 6:
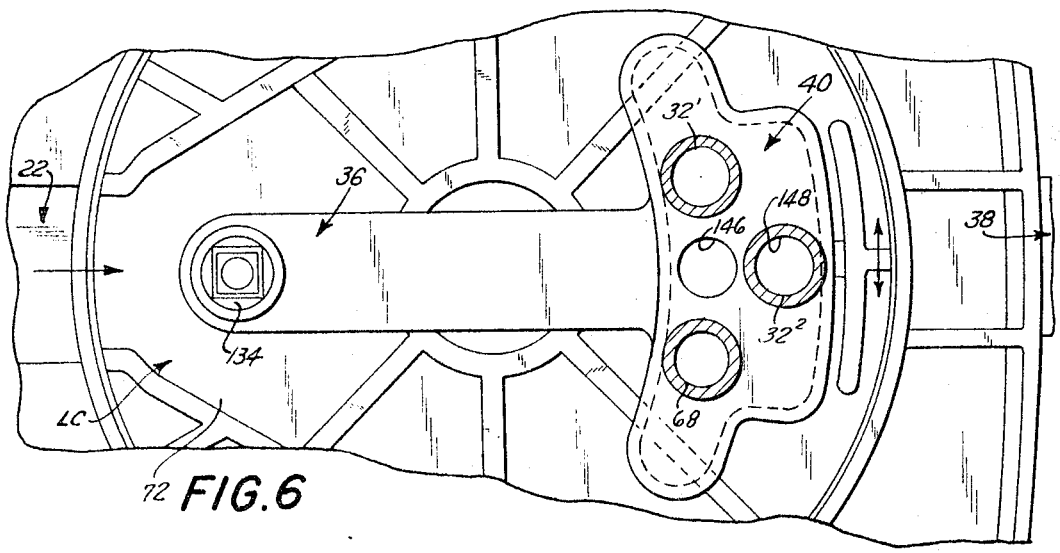
FIG. 6 is a fragmentary view taken in cross-section in the plane of the line 6—6 of FIG. 3.

One of the by-pass conduits (32' and $32^2$ and 68) will be opened between the lower and upper chambers at one time in the operation of the sprinkler. For this the means 40 on the pattern selector switch 36 comprises a closure member having the two openings 146 and 148. This switch is shown in FIG. 6 in the "rectangle" pattern position where the opening 148 registers with the entrant opening of the "rectangle" pattern conduit $32^2$ and is shown in FIG. 7 in the "square" pattern position where the opening 146 registers with the entrant opening of the "square" pattern conduit 32'. When the switch is moved clockwise (in FIG. 7) to its other extreme position, the opening 146 registers with the entrant opening to the "round" pattern conduit 68. The switch 36 thus is movable to selectively open the entrant end of one of the by-pass conduits while closing the entrant ends of the other by-pass conduits, the closing action of the conduits being best indicated in FIG. 5 (where the conduit $32^2$ is closed) and in FIG. 3 (where the conduit 68 is closed).

Figure 13:
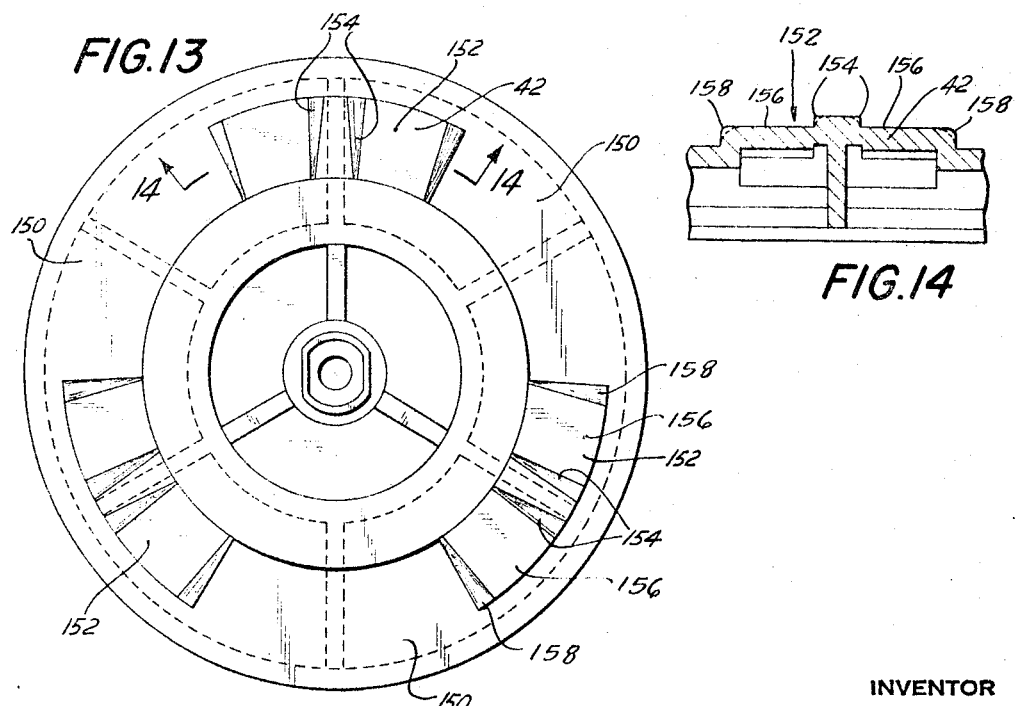
FIG. 13 is a face view of the deflector element of the sprinkler.
Figure 14:
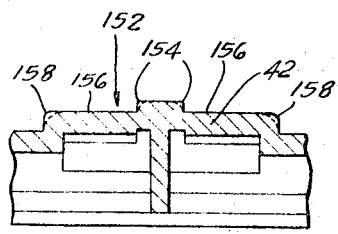
FIG. 14 is a fragmentary view of the deflector taken in cross-section along the arcuate path designated by the line 14—14 of FIG. 13.

The deflector 42 is shaped as best shown in FIGS. 3, 13 and 14 of the drawings to provide non-deflecting regions 150 and deflecting regions 152, there being three non-deflecting regions and three deflecting regions (see particularly FIG. 13). The deflecting regions 152 are provided with different angled surfaces 154, 156 and 158 (FIG. 14) arranged at different intersecting angles with the water jets coming from the two nozzles 72', 74'.

In order to achieve the feature of uniform distribution of the watering over a selected pattern, the design of the exemplified structure of the invention incorporates two important and fundamental features:

(a) When a solid jet of water ejects from a nozzle (72, 74) at a fixed elevation angle it will water a ring area away from the sprinkler. The deflecting surfaces on the deflector 42 intersects the water jet for watering areas nearby the sprinkler and rotates at considerably faster speed than the nozzles. The deflecting surfaces are provided at various intersecting angles with the water jet. A number of sets or lobes of these deflecting surfaces are provided to obtain maximum uniformity from the sprinkler location to the boundary of watering. The exemplified structure described has three sets of three deflecting surfaces at two intersecting angles with the water jets from two nozzles. Therefore, at any instant, one jet will be non-deflected and the other deflected. The shape of the deflecting surfaces can be designed in other ways to achieve a uniform water distribution over the watering area. The nozzles also may be made to rotate at considerably faster speed than the deflector to achieve the same effect. However, the faster rotation of the nozzles shortens the maximum distance of a water projectile due to a spiral effect of the water path in the air. Based on this deflector construction, the water distribution through a sector of watering area from the sprinkler is practically uniform.

(b) In order to assure the same amount of water deposited in any sector of a watering area in irregular shape, a definite relationship is maintained at any two instants to cover two different sectors. In other words, when the water flow rate decreases by the throttling effect at a bypass conduit by the cam to decrease the range of watering, the distributor head must rotate faster. This requirement is provided in the design by arranging the impeller conduit in parallel with the by-pass conduit. Based on the basic hydraulic theory, the flow rate through the impeller conduit increases as that through the by-pass conduit decreases. Furthermore, under normal piping connection for a home, the available water pressure in the lower chamber increases as the overall flow rate decreases. As a result the impeller and the distributor head will rotate faster when the watering range decreases.

The operation of the sprinkler detailed in FIGS. 3 to 14 of the drawings is that heretofore described in connection with the diagrammatic structure shown in FIG. 2 of the drawings and summarized in the fundamental features just described.

It will be apparent that many changes may be made in the exemplified structure of the sprinkler without departing from the spirit of the invention.

I claim:

1. A selective pattern lawn sprinkler comprising a housing provided with a fluid inlet, an impeller rotatively mounted in said housing in open fluid communication with the housing interior, a rotary nozzle carrying fluid distribution head connectedly driven by said impeller rotatably mounted in said housing in open fluid communication with the housing interior, a pattern selector cam rotatably mounted in said housing connectedly driven by said impeller, said cam being provided with fluid flow-varying passages having exit ends in open communication with the housing interior, an impeller directed conduit mounted in said housing in fluid communication with said fluid inlet, and a cam directed conduit mounted in said housing in separate fluid communication at its entrant end with said fluid inlet, said cam conduit being in fluid communication at its exit end with entrant ends of said cam passages.

2. The selective pattern sprinkler of claim 1 in which the cam is coupled to and rotatable with the distribution head.

3. The selective pattern sprinkler of claim 2 in which the cam is floatingly mounted for axial movement on the distribution head.

4. The selective pattern sprinkler of claim 1 in which the cam is floatingly mounted for axial movement on the distribution head, and the cam directed conduit is floatingly mounted axially in the housing.

5. The selective pattern sprinkler of claim 1 in which the cam is provided with a plurality of sets of flow-varying passages, each set determining a different fluid flow pattern, and in which there are a plurality of cam directed conduits mounted in the housing, each conduit having its exit end in communication with one of the sets of flow-varying passages.

6. The selective pattern sprinkler of claim 1 in which the cam is provided with a plurality of sets of flow-varying passages, each set determining a different fluid flow pattern, and in which there are a plurality of cam directed conduits mounted in the housing, each conduit having its exit end in communication with one of the sets of flow-varying passages, and in which there is an additional conduit mounted in said housing in fluid communication at its entrant end with the fluid inlet, the exit end of said additional conduit being in open communication with the fluid distribution head.

7. In the selective pattern sprinkler of claim 5, a selector switch movably mounted in said housing associated with said cam directed conduits and provided with an externally arranged manually manipulable indicator, the selector switch being provided with means for selectively opening one at a time the entrant ends of said cam directed conduits.

8. A selective pattern lawn sprinkler comprising a housing, a partition in said housing dividing the same into a lower chamber and an upper chamber, the said upper chamber having mounted therein a rotary impeller, a rotary nozzle carrying fluid distribution head drivenly connected to said impeller and a rotary pattern selector cam drivenly connected to said impeller, said cam being provided with fluid flow-varying passages, the said lower chamber being provided with a fluid inlet and the nozzle in said distribution head defining a fluid outlet, an impeller directed conduit in said upper chamber arranged in fluid communication with said lower chamber, and a plurality of by-pass conduits in said upper chamber arranged with their entrant ends in fluid communication with said lower chamber, at least one of said plurality of conduits having its exit end in communication with the flow-varying passages of said rotary cam.

9. The selective pattern sprinkler of claim 8 in which the cam is provided with a plurality of sets of said flow-varying passages, each set determining a different fluid flow pattern, and the plurality of conduits comprise at least two conduits, each having its exit end in communication with one of the sets of said flow-varying passages.

10. The selective pattern sprinkler of claim 9 in which the plurality of conduits includes a third conduit, the exit end of which is in open communication with said upper chamber.

11. In the selective pattern sprinkler of claim 9, a selector switch movably mounted in said lower chamber associated with said by-pass conduits and provided with an externally arranged manually manipulable indicator, the said selector switch being provided with means for selectively opening the entrant end of one of said by-pass conduits and closing the others.

12. The selective pattern sprinkler of claim 1 in which a rotary deflector surmounts the fluid distribution head, is rotatably mounted in said housing and is connectedly driven by said impeller.

13. The selective pattern sprinkler of claim 1 in which a rotary deflector surmounts the fluid distribution head and is rotatably mounted in said housing, and reduction gearing in said housing connecting the impeller with the distribution head and the cam to rotate the same at one reduced speed and with the deflector to rotate the deflector at another reduced speed.

14. A selective pattern sprinkler comprising a housing provided with a fluid inlet, an impeller rotatably mounted in said housing in fluid communication with the housing interior, an impeller directed conduit in said housing in fluid communication with said fluid inlet, a rotary nozzle carrying fluid distribution head rotatably mounted in said housing in open fluid communication with the housing interior, a rotary deflector, surmounting the fluid distribution head rotatably mounted in said housing, and reduction gearing in said housing connecting the impeller with the distribution head to rotate the same at one reduced speed and with the deflector to rotate the deflector at another reduced speed.

15. The selective pattern sprinkler of claim 14 in which the reduction gearing is connected to the distribution head and the deflector to rotate the distribution head at one reduced speed and to rotate the deflector at another and less reduced speed, whereby the deflector rotates at a speed faster than that of the distribution head.

16. The selective pattern sprinkler of claim 14 in which the rotary nozzle carrying fluid distribution head is provided with at least one nozzle mounted thereon at a selected elevational angle.

17. The selective pattern sprinkler of claim 14 in which the rotary nozzle carrying fluid distribution head is provided with two nozzles spaced 180° apart and mounted on the distribution head at a selected elevational angle.

18. The selective pattern sprinkler of claim 14 in which the rotary deflector is provided with circumferentially spaced deflecting and non-deflecting regions.

19. The selective pattern sprinkler of claim 14 in which the rotary nozzle carrying fluid distribution head is provided with at least one nozzle mounted thereon at a selected elevational angle, and the rotary deflector is provided with circumferentially spaced deflecting and nondeflecting regions.

20. The selective pattern sprinkler of claim 19 in which the deflecting regions are provided with different angled surfaces arranged at different angles with the water jets coming from the nozzle or nozzles.

References Cited

UNITED STATES PATENTS

| | | | |
|---|---|---|---|
| 1,696,385 | 12/1928 | Coles | 239—236 |
| 2,601,559 | 6/1952 | Riblet | 239—232 |
| 3,405,871 | 10/1968 | Mullan | 239—236 |

ALLEN N. KNOWLES, Primary Examiner

B. BELKIN, Assistant Examiner.

U.S. Cl. X.R.

239—232, 236